United States Patent
Sbodio et al.

(10) Patent No.: US 12,547,905 B2
(45) Date of Patent: Feb. 10, 2026

(54) PROBABILISTIC ENTITY-CENTRIC KNOWLEDGE GRAPH COMPLETION

(71) Applicant: International Business Machines Corporation, Armonk, NY (US)

(72) Inventors: Marco Luca Sbodio, Castaheany (IE); Natalia Mulligan, Dublin (IE); Vanessa Lopez Garcia, Dublin (IE); Inge Lise Vejsbjerg, Dublin (IE); Joao H Bettencourt-Silva, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 17/655,669

(22) Filed: Mar. 21, 2022

(65) Prior Publication Data

US 2023/0297851 A1 Sep. 21, 2023

(51) Int. Cl.
- G06F 16/901 (2019.01)
- G06F 16/951 (2019.01)
- G06N 5/022 (2023.01)

(52) U.S. Cl.
CPC .......... G06N 5/022 (2013.01); G06F 16/951 (2019.01)

(58) Field of Classification Search
CPC .... G06N 5/022; G06F 16/951; G06F 16/9024
See application file for complete search history.

(56) References Cited

U.S. PATENT DOCUMENTS

| | | | |
|---|---|---|---|
| 6,115,709 A | 9/2000 | Gilmour | |
| 9,600,769 B1 * | 3/2017 | Liu | H04L 51/02 |
| 10,339,420 B1 * | 7/2019 | Lecue | G06F 18/22 |
| 10,482,139 B2 | 11/2019 | Khaitan | |
| 2017/0024375 A1 | 1/2017 | Hakkani-Tur | |
| 2019/0163835 A1 | 5/2019 | Scheideler et al. | |
| 2019/0278777 A1 * | 9/2019 | Malik | G06F 16/9024 |

(Continued)

FOREIGN PATENT DOCUMENTS

| CN | 109885700 A | 6/2019 |
|---|---|---|
| CN | 111191044 A | 5/2020 |

(Continued)

OTHER PUBLICATIONS

Ammar, et al., "Using a Personal Health Library-Enabled mHealth Recommender System for Self-Management of Diabetes Among Underserved Populations: Use Case for Knowledge Graphs and Linked Data." Published Mar. 16, 2021 by JMIR Publications. 21 pages. https://formative.jmir.org/2021/3/e24738/.

(Continued)

*Primary Examiner* — Hassan Mrabi
(74) *Attorney, Agent, or Firm* — Jordan T. Schiller (57) ABSTRACT

A first set of an entity is received, where the first set of data includes distinct characteristics of the entity. A second set of data on one or more domains of the entity is received. Using the first and second set of data, a probabilistic knowledge graph for the entity is generated that includes an entity node, a first plurality of nodes, and a second plurality of nodes. The first plurality of nodes are connected to the entity node and represent each of the distinct characteristics. The second plurality of nodes are connected via probabilistic edges, where each of these probabilistic edges has an associated confidence score. This confidence score is determined using the second set of data.

25 Claims, 3 Drawing Sheets

(56) References Cited

U.S. PATENT DOCUMENTS

| | | | |
|---|---|---|---|
| 2020/0097601 A1* | 3/2020 | Han | G06F 16/36 |
| 2020/0133962 A1* | 4/2020 | Kuo | G06F 40/30 |
| 2020/0193038 A1* | 6/2020 | Ravizza | G06F 16/9024 |
| 2020/0285657 A1* | 9/2020 | Ravizza | G06F 16/288 |
| 2021/0012216 A1* | 1/2021 | Giovannini | G06V 10/768 |
| 2021/0209125 A1* | 7/2021 | Tokarev Sela | G06F 16/9024 |
| 2021/0287102 A1* | 9/2021 | Fadnis | G06N 5/02 |
| 2021/0334669 A1* | 10/2021 | Li | G06F 18/29 |
| 2022/0121965 A1 | 4/2022 | Chatterji et al. | |
| 2022/0327356 A1* | 10/2022 | Rossiello | G06N 5/025 |
| 2023/0103430 A1* | 4/2023 | Wang | G06N 5/02 706/12 |
| 2023/0169358 A1* | 6/2023 | Zayats | G06N 20/00 706/55 |
| 2023/0206127 A1* | 6/2023 | Zhao | G06F 16/36 706/12 |
| 2025/0156640 A1* | 5/2025 | Ramsl | G06F 40/30 |

FOREIGN PATENT DOCUMENTS

| | | | | |
|---|---|---|---|---|
| CN | 111386520 A | | 7/2020 | |
| CN | 112182330 A | * | 1/2021 | G06V 10/22 |
| CN | 112580716 A | | 3/2021 | |
| CN | 114691973 A | * | 7/2022 | G06N 3/045 |
| CN | 116324755 A | | 6/2023 | |
| CN | 116796838 A | | 9/2023 | |
| JP | 2023-138929 A | | 10/2023 | |
| WO | 2021/098372 A1 | | 5/2021 | |
| WO | 2021/131013 A1 | | 7/2021 | |

OTHER PUBLICATIONS

Anonymous. "Adoption & Child Welfare Services in the US." Last updated Feb. 28, 2022. 8 pages. Published by Ibis World. https://www.ibisworld.com/industry-statistics/market-size/adoption-child-welfare-services-united-states/.

Anonymous. "NHE Fact Sheet." Printed Feb. 24, 2022. 4 pages. Published by Centers for Medicare and Medicaid Services. https://www.cms.gov/Research-Statistics-Data-and-Systems/Statistics-Trends-and-Reports/NationalHealthExpendData/NHE-Fact-Sheet.

Anonymous. "Policy Basics: The Supplemental Nutrition Assistance Program (SNAP)." Last updated Jun. 25, 2019. 10 pages. Published by Center on Budget and Policy Priorities. https://www.cbpp.org/research/food-assistance/the-supplemental-nutrition-assistance-program-snap.

Balog, et al., "Personal Knowledge Graphs: A Research Agenda." Published Sep. 23, 2019 by ACM. 4 pages. In ICTIR '19: Proceedings of the 2019 ACM SIGIR International Conference on Theory of Information Retrieval. pp. 217-220. https://doi.org/10.1145/3341981.3344241.

Das, et al., "Probabilistic Case-based Reasoning for Open-World Knowledge Graph Completion." Published Oct. 9, 2020 by ARXIV. 14 pages. https://arxiv.org/abs/2010.03548.

Jia, et al., "Triple Trustworthiness Measurement for Knowledge Graph." Published Feb. 19, 2019 by ARXIV. 8 pages. https://arxiv.org/abs/1809.09414.

Lin, et al., "Personalized Entity Resolution with Dynamic Heterogeneous Knowledge Graph Representations." Last updated Apr. 14, 2021. 11 pages. Published by ARXIV. https://arxiv.org/abs/2104.02667.

Rainey, Rebecca. "Jobless claims reach 22 million over four weeks." Published Apr. 16, 2020. 7 pages. Published by Politico. https://www.politico.com/news/2020/04/16/coronavirus-unemployment-claims-numbrs-190026.

Safavi, et al., "Personalized Knowledge Graph Summarization: From the Cloud to Your Pocket." Published in 2019 by IEEE. 10 pages. In 2019 IEEE International Conference on Data Mining (ICDM), pp. 528-537, doi: 10.1109/ICDM.2019.00063.

Shi, et al., "Semantic Health Knowledge Graph: Semantic Integration of Heterogeneous Medical Knowledge and Services." Published Feb. 12, 2017. 13 pages. In BioMed Research International, vol. 2017. https://doi.org/10.1155/2017/2858423.

Su, et al., "Automatic Construction of Subject Knowledge Graph based on Educational Big Data." Published May 22, 2020 by ACM. 7 pages. In ICBDE '20: Proceedings of the 2020 the 3rd International Conference on Big Data and Education. pp. 30-36. https://doi.org/10.1145/3396452.3396458.

Zhao, et al., "Multi-source knowledge fusion: a survey." Published Apr. 8, 2020 by Springer. 26 pages. In World Wide Web vol. 23, pp. 2567-2592 (2020). https://link.springer.com/article/10.1007/s11280-020-00811-0.

Mani, et al., "Five trends shaping the future of Medicaid." Published Mar. 29, 2019. 10 pages. Published by McKinsey and Company. https://www.mckinsey.com/industries/healthcare-systems-and-services/our-insights/five-trends-shaping-the-future-of-medicaid.

The State Intellectual Property Office of People's Republic of China, "First Office Action", Oct. 10, 2025, 15 p. CN Application No. 202310171797.0.

\* cited by examiner

PROBABILISTIC ENTITY-CENTRIC KNOWLEDGE GRAPH COMPLETION

BACKGROUND

As the volume of data that is available for analysis grows, so too are the requirements for (and demands of) the data structure we use to store and evaluate this data. One type of data structure is a knowledge graph (sometimes called a semantic network). A knowledge graph includes nodes and edges, where nodes are real-world entities (e.g., objects, events, situations, concepts), and edges detail relationships between these nodes. A knowledge graph is typically stored in a graph database and visualized as a graph structure. By arranging information in this way, knowledge graphs allow for logical inference, such that a computing system utilizing a knowledge graph to, e.g., answer a query may access implicit information within the knowledge graph to answer the query (e.g., even if the computing system did not otherwise have access to any data that explicitly provided that implicit information).

SUMMARY

Aspects of the present disclosure relate to a method, system, and computer program product relating to a probabilistic entity-centric knowledge graph. For example, the method includes receiving a first set of data on an entity, where the first set of data includes distinct characteristics of the entity. The method further includes receiving a second set of data on one or more domains of the entity. The method further includes generating, using the first and second set of data, a probabilistic knowledge graph that includes an entity node and a first and second plurality of nodes. The first plurality of nodes are connected to the entity node and represent each of the distinct characteristics. The second plurality of nodes are connected within the probabilistic knowledge graph via probabilistic edges that have associated confidence scores. These confidence scores are determined using the second set of data. A system and computer program configured to execute the method described above are also described herein.

For another example, further aspects of this disclosure relate to a method that includes receiving a first set of data on a human, where the first set of data includes distinct characteristics of the human. The method further includes receiving a second set of data on one or more domains of the human. The method further includes generating, using the first and second set of data, a probabilistic knowledge graph that includes a human node and a first and second plurality of nodes. The first plurality of nodes are connected to the entity node and represent each of the distinct characteristics. The second plurality of nodes are connected within the probabilistic knowledge graph via probabilistic edges that have associated confidence scores. These confidence scores are determined using the second set of data.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to knowledge graphs, while more particular aspects of the present disclosure relate to generating probabilistic entity-centric knowledge graphs that include both factual entities and relationships of an entity as well as probabilistic entities of the entity. While the present disclosure is not necessarily limited to such applications, various aspects of the disclosure may be appreciated through a discussion of various examples using this context.

Knowledge graphs are data structures that are focused on a predetermined subject, where each given knowledge graph is designed to store data on a set of conceptual elements of the subject and a set of relationships between these elements as it relates to that predetermined subject. A well-constructed knowledge graph will prioritize elements that have significant relationships to this subject, rather than including more elements that are within any conceptual sphere of the subject of the knowledge graph. A knowledge graph is generated and often stored in a "spiderweb" format, where entities are stored as "nodes" and connected by "edges" that depict the aforementioned relationships.

Knowledge graphs can be useful tools at data analysis, as they can allow computing systems to make inferences about a subject of the knowledge graph (e.g., where the computing system does not have the data to directly support this inference). A knowledge graph often is initially created with one or more curated and focused datasets of known elements that have known relationships to the subject. In some instances, a utility of a knowledge graph is directly and positively correlated with the size of the knowledge graph, so long as the data of the knowledge graph is accurately and judiciously compiled. As such, many conventional techniques and systems relate to "completing" an initial knowledge graph, where completing (otherwise referred to as expanding) the initial knowledge graph includes adding new elements and relationships to this initial knowledge graph. As used herein, completing a knowledge graph should not be understood to refer to as accomplishing the "final" steps that make the knowledge graph "perfect" or as good as possible, but rather it is to be understood as referring to the act of adding additional subject matter to the knowledge graph to make the knowledge graph more accurate and useful.

Knowledge graphs may be constructed within nearly any subject of focus. For example, a knowledge graph may be focused on an individual human, a group of humans with similar characteristic (such a group of humans referred to herein as a cohort), a material, an organization, a product, a medical condition, or the like. While the disclosure primarily discusses a knowledge graph that is focused on either a material or a human or cohort (such a knowledge graph being referred to herein as a entity knowledge graph or EKG), one of ordinary skill in the art will understand that much/most/all of this disclosure further applies to knowledge graphs that have other focuses. For a EKG, the entities and the relations between them are of personal, rather than general, importance, such that entities are included when they are important to the human or cohort of focus (rather than important in other contexts), and relationships will be defined from the framework of the human. Similarly, when a new material is identified, elements within the sphere of the subject of that new material may not be universally applied within material science, but rather (as would be understood by one of ordinary skill in the art of material science) the very utility of a new material is that it has a new arrangement of properties (as may be depicted in a respective knowledge graph as nodes).

However, a primary way in which conventional techniques and systems complete a knowledge graph is by looking to "open world" data sources, which is to say public data repositories (e.g., online dictionaries, medical or scientific journals, news sources, or the like). For example, a knowledge graph may be about a specific type of vehicle that was manufactured in a specific year, so after an initial knowledge graph is created from a curated data set, a system may crawl the Internet to find more data about this specific type of vehicle from that specific year to complete the knowledge graph. This may include linking to an existing entity of the knowledge graph, such as via "long tail" entity-linking. Many conventional systems and techniques only gather/receive data from certain trustworthy open world data sources, and/or would only gather/receive data when that data could be confirmed from other open world data sources, in order to verify that the eventual completed knowledge graph included only known facts with known and confirmed relationships.

However, it can be extremely difficult (if not impossible) to meaningfully look to open-world data sources to expand (much less complete) a EKG or a material-centric knowledge graph, given how little data is available that is known to be accurate as to entities such as individual humans or new materials. For a significant number of entities such as humans or new materials, a computing system may fail to identify any information from the typical public data stores (those same online encyclopedias, medical/scientific journals, and news sources) that a conventional knowledge graph system would utilize to complete a knowledge graph. As such, conventional knowledge graph systems and techniques may lack a technical ability to complete a knowledge graph for an entity such as a human or new material in a manner that would fully realize the utility of that knowledge graph in subsequent analysis. For example, though some conventional systems utilize a neural network to effectively predict new entities or relationships in knowledge graphs, such neural networks are generally known to be "data hungry" (e.g., such that they need an abundance of surrounding data in order to accurately predict a small amount of new data). Therefore, even such conventional "solutions" geared towards trying to predict new entities and relationships in a data-starved realm is unlikely to predict usable information for an knowledge graph regarding an entity such as a human or a material.

Further, such failures to complete a knowledge graph is not without drawbacks. As mentioned above, knowledge graphs are excellent tools for executing logical inferences when used by other tools. For example, an accurately completed EKG would be understood to be extremely useful in domains such as health analytics, social services, societal welfare, and the like, where the EKG can be feed into an artificial intelligence (AI) environment for analysis. Similarly, a well-completed material-centric knowledge graph would be extremely useful in domains that look to determine which materials would be best used for various products, which is extremely useful given the ever-increasing number of materials (and the ever-increasing desire for more highly-specialized devices). Conversely, an incomplete or slightly inaccurate material-centric knowledge graph or EKG (e.g., one with sparse entities, and/or with incomplete/fragmented relationships) might be substantially less useful in such an environment, but rather such a knowledge graph might require such significant manual data manipulation by an expert in the field that the eventual utility of the conventional knowledge graph system may be significantly reduced (if not entirely eliminated).

Aspects of this disclosure improve or address technical shortcomings of conventional systems to better generate knowledge graphs. For example, aspects of this disclosure relate to generating knowledge graphs that incorporate probabilistic entities and relationships of entities. One or more computing devices that include one or more processing units executing instructions stored on one or more memories may provide the functionality that addresses these problems, where said computing device(s) are herein referred to as a controller.

Specifically, this controller is configured to crawl through open-world data sources and identify data that might relate to an entity of a knowledge graph, even where the controller cannot confirm that this data relates to the specific entity of which the knowledge graph is focused on. Once the controller identifies that the data that might be related, the controller further identifies a likelihood that this data is related. This includes the controller quantifying a probability that the data applies to the entity, as well as quantifying a reliability of the data. The controller may continue this process to fully complete the knowledge graph with such probabilistic data, until the knowledge graph has a full set of elements and relationships with relevant confidence scores.

For example, if the controller determines that the data indicates that humans with characteristics A, B, C, D, and E have a risk of condition XYZ (where the human of the EKG has four of those characteristics), then the controller may determine that the probability is 80% (with a very rough approximation given that the human has four of five characteristics). As such, the controller may create a node with the condition "XYZ," where the edge connecting this node to the human has a probability of "80%." However, if the controller determines that the data came from a study that was not peer-reviewed and was only moderately graded historically, then the controller may determine that the data is only moderately reliable (lowering a confidence score of that edge). Similarly, if the controller determines that a new material has properties F, G, H, and I typically also has a property of J (where the material of the knowledge graph has all four of those properties), then the controller may determine that the probability is 95% based on how "sticky" those properties tend to be across material science. In other examples, the controller may identify other ways to determine the likelihood that the given element and/or relationship impacts the user, as well as calculating the reliability of the data behind that element and/or relationship.

In some examples the controller is configured to receive the initial knowledge graph for the entity as generated by an external entity. In other examples, the controller receives raw data on the entity (e.g., factual data on elements and relationships of the entity) as a set of distinct characteristics of the entity, in response to which the controller transforms these distinct characteristics into the initial knowledge graph. Where the controller receives the raw data itself, it creates all nodes with this data in the knowledge graph such that each edge connecting said node has a probability of 1 (e.g., on a scale of 0.0 to 1.0, where 1.0 is known to be factually true and 0.0 is known to be factually false). Once the controller has access to the initial knowledge graph (whether received or generated), the controller crawls or otherwise accesses greater domain knowledge databases. For example, the controller may be fed data on broader sets of the entity such that controller may determine if any of this matches the entity of the knowledge graph. Alternatively, or additionally, the controller may crawl across databases to identify data that may match the knowledge graph. If the controller finds any data that appears to match (whether as a node or an edge or both), the controller may input this into the knowledge graph along with the respective score/weights for this data. The controller may use schemas or the like to ensure that what is being adding to the knowledge graph is consistent to improve the utility of the knowledge graph at an eventual usage step.

Once the controller has crawled through and processed relevant data from the public domain (and subsequently updated the knowledge graph as discussed), the controller outputs this completed knowledge graph (where "completed" does not indicate that it contains all information that might be helpful, but rather just relates to the conclusion of the step of processing the knowledge graph with the data available as discussed herein). The completed knowledge graph includes known facts with known relationships (e.g., that have a probability of 1.0) as well as probable facts and relationships (e.g., that have a probability less than 1.0 as received from the open world data sources). The controller may open up the complete knowledge graph for use in various downstream tasks. For example, where the knowledge graph is a EKG and the entity is a human or cohort, such analysis may include health care environments, social services (e.g., as by a governmental body), for analysis in identifying suitable interventions (e.g., an activity that relates to providing help to a person before that person affirmatively requests that help). In other examples, where the knowledge graph is for an entity of a human, the downstream tasks may include manufacturing tasks, design tasks, research tasks, or the like.

Further, this manner of generating the knowledge graph (where the knowledge graph includes not only more nodes and edges than would be generated by conventional approaches, but further includes the probabilistic data related to these additional nodes and edges) may increase a general utility of the knowledge graph. For example, as a result of bringing in this data that is not verified as factual but is determined to nonetheless have a probabilistic relationship with the entity, the controller may enable the inclusion of disparate datasets that would otherwise be left siloed and unaccounted for within a single place (e.g., as would happen for entities such as humans or materials when they are transformed into knowledge graph via conventional means). For another example, as compared to a conventional knowledge graph (that only nodes and edges with a probability of 1.0), analysis of this knowledge graph includes the consideration of things such as future possibilities or current (but not yet verified) explanations of ongoing phenomenon. Nodes and edges related to these unverified and/or future data points can be merged and stabilized within the knowledge graph and/or across all knowledge graphs generated by the controller. By keeping the use of such probabilistic data stable over time as generated across numerous generated knowledge graph, aspects of this disclosure improve an interpretability of nodes and edges of generated knowledge graphs.

Figure 1:
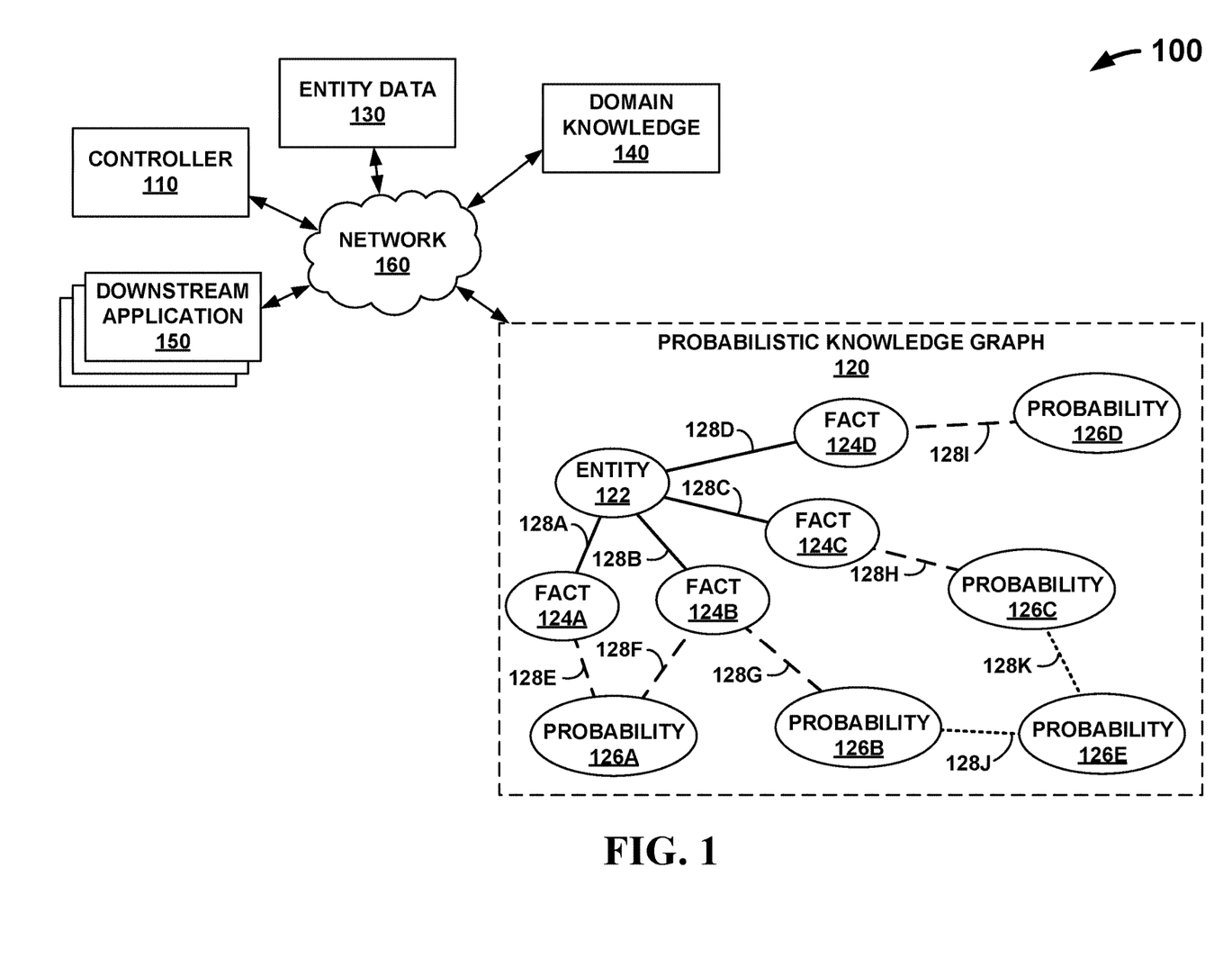
FIG. 1 depicts a conceptual diagram of an example system in which controller may generate a probabilistic entity-centric knowledge graph.
Figure 2:
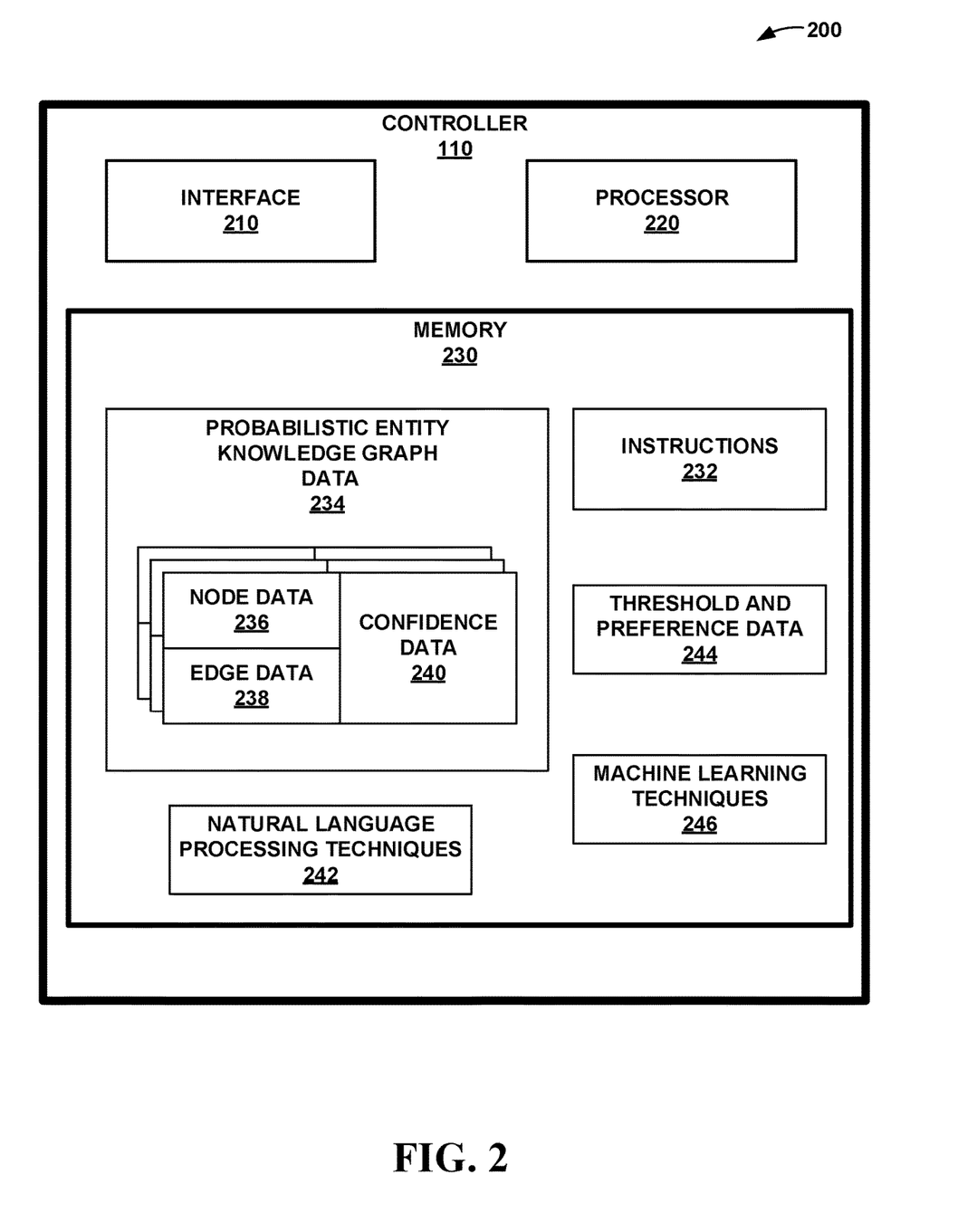
FIG. 2 depicts a conceptual box diagram of example components of the controller of FIG. 1.

For example, FIG. 1 depicts environment 100 in which controller 110 generates probabilistic knowledge graph 120 (sometimes referred to as probabilistic KG 120 herein) as discussed herein. Controller 110 may include a processor coupled to a memory (as depicted in FIG. 2) that stores instructions that cause controller 110 to execute the operations discussed herein. Though controller 110 is depicted as being distinct from probabilistic KG 120 in FIG. 1 for purposes of illustration, in some examples probabilistic KG 120 may be stored on a computing device of controller 110.

As depicted, probabilistic KG 120 includes a plurality of nodes, such as entity 122, facts 124A-124D (collectively referred to as "facts 124"), and probabilities 126A-126E (collectively referred to as "probabilities 126"). These nodes (which are collectively referred to herein as "nodes 122-126") are connected according to their respective relationships via edges 128A-128K (collectively referred to as "edges 128"). Controller 110 may generate probabilistic KG 120 from entity data 130 and domain knowledge 140. For example, entity data 130 may include raw data on the entity of probabilistic KG 120. In some examples, this may include an initial knowledge graph as saved in entity data 130, but in other examples controller 110 will generate a knowledge graph from unstructured/raw data as stored in entity data 130. Where the entity is a human, the distinct characteristics of entity data 130 may include such data as health care records, human notes from expert interactions with the human (e.g., a doctors appointment, a financial meeting with an analyst, a meeting with a counselor or social worker, etc.), social care records, or other records that directly document information on the entity. Conversely, where the entity is a material, the distinct characteristics may include various material properties such as a conductivity a corrosion resistance, density, a malleability, an elasticity, a fracture toughness, a hardness, a plasticity, or the like. Other types of distinct characteristics is possible for other entities. From here, controller 110 may generate an initial knowledge graph using a schema that defines classes and relations of interest. For example, to better set up knowledge graphs for use, these knowledge graphs may define a static structure of classes and relationships, so that an analysis of these knowledge graphs is always consistent (e.g., such that controller 110 would not generate a first knowledge graph to have an "age" node of "in his 20s" and a second knowledge graph with an age node of "23 years, 5 months, and 6 days," but rather controller 110 would use the same scheme to make all knowledge graph as consistent as possible). From entity data 130, controller 110 may receive or generate entity 122, facts 124, and edges 128A-128D, each of which have a probability of 1.0.

Further, as discussed herein controller 110 may gather data from domain knowledge 140. Data within domain knowledge 140 may include both structured and unstructured data, such as tagged and organized records (e.g., within a spreadsheet), untagged handwritten notes, professional literature, survey results, other relevant knowledge graphs or bases, relevant machine learning models, association rules, probability or statistical models, or the like. Controller 110 may crawl through or access some or all of these in order to determine probabilistic data that relates to the entity that might be incorporated into probabilistic KG 120. Extracting and homogenizing this data from domain knowledge 140 includes such techniques as natural language processing, ontology based information extraction, association rule mining, data modeling, prediction modeling, and the like. Put differently, in addition to identifying that data from domain knowledge 140 is predicted to relate to the relevant entity, controller 110 will extract and then align this data to make it fit as intended within probabilistic KG 120. This may include fuzzy mapping rules (e.g., mapping based on similarity metrics), using a normalization layer when importing data domain knowledge 140 (including normalizing the respective confidence scores), or the like.

Eventually, controller 110 may identify a full set of candidate probabilities to be added to probabilistic KG 120. Controller 110 may determine what to add to the probabilistic KG 120 based on entities and attributes of the initial knowledge graph of the entity. For example, where the entity is a human, an initial knowledge graph may include two entities, one being an "age" of "10-15" and the second being a "social concern" of "drug abuse." Upon controller 110 querying domain knowledge 140, controller may identify a first data source that contains a 3-ary association where there is an "age" of "child," a "social concern" of "substance abuse" and a new entity of "social problem" being "risk of school problem."

Controller 1110 may determine that an age of "10-15" and a social concern of "drug abuse" are respectively aligned with an age of "child" (alignment score 0.9) and a social problem of "substance abuse" (alignment score 1.0). Controller 110 may calculate a probability score using a probability metric of the candidate relation and alignment/similarity scores of aligned entities and relations. For example, controller 110 may determine that "child" is a wider entity than "10-15," such that a probability is generally reduced as a result of this misalignment. Specifically, in what may be described as the "most naïve" approach, controller 110 may calculate the probability score to be 0.68 (0.75*0.9*1.0). As such, controller 110 may determine a new probability node to include in the probabilistic KG 120, such that existing nodes of age "10-15" and social concern of "drug abuse" is associated with the new node of "school problem."

Controller 110 may calculate reliability and/or confidence scores for each extracted relation. In some examples, a machine learning model may predict the reliability (trust) scores. Such a model may be initialized with initial scores to improve the ability to hone in at an appropriate/desired end result. Once this domain knowledge is turned into data for the probabilistic KG 120, this may too be run through the schema used to generate the initial knowledge graph to generate probabilities 126 and probabilistic edges 128G-128K, where each of these probabilistic edges 128G-128K and probabilities 126 have a probability between 0.0 and 1.0.

In some examples, controller 110 may elect to not add some candidates to the probabilistic KG 120. For example, consider the above example regarding the 10-15 year old human, only a domain knowledge study included information on adults. Even if all other criteria matched, controller 110 may determine that an entity that relates to "adult" is semantically inconsistent with the entity of "10-15" from the instant user data, such that it should not be included. Specifically, controller 110 may determine that a confidence score of an edge that would be connected to this node falls below a threshold level, where the "consequence" of falling below this threshold level is that controller does not add this candidate node and edge.

In some examples, controller 110 may execute a general finalizing process as part of completing the knowledge graph. Controller 110 may start this completion process by clustering those candidate relations that represent similar knowledge (e.g., using graph/relation embedding). Controller 110 may cluster candidate relations when these candidate relations were extracted from heterogeneous data sources within domain knowledge 140.

Once clustered, controller 110 may produce a single n-ary relation with a score that reflects probability score and reliability of each respective source. Controller 110 may further select/calculate/estimate the relation type and scores based on a number of variables, including probability scores calculated or estimated in the previous step across this group of relations, relation types (e.g., causal relation, association, etc.), and/or data source reliability/confidence scores (i.e., measure of trust that may be based on the confidence in data source data with variable granularity). In some examples, controller 110 may produces a single n-ary relation (while keeping all relations as evidence/support/explanation) from a cluster of similar candidate relations by a process that includes: selecting the relation with the highest relation type weight (e.g., where "increases" has greater weight than "associated with") combined with a score reflecting the probability of the fact; and associating two scores with every selected relation, these two scores being the probability score of the selected relation and a reliability of the data source that is associated with the selected relation (e.g., where this score may be adjusted if there is a support from "more trusted data sources"). Controller 110 may further execute this adjustment by taking into account supporting data source reliability or trust score and relation similarity (using for example relation embedding similarity in the embedding space).

In some examples, controller 110 may normalize probability scores in a cluster. Controller 110 may normalize the scores for each relation based on the number of factors that are either predefined or learned, including alignment score (e.g., where an age of "10-15" is aligned with an age of "child"), a relevance to the entities of the initial knowledge graph, or the like.

Controller 110 may finish the act of completing the initial knowledge graph by extending the probabilistic knowledge graph with the n-ary relations from the steps above. In this way, controller 110 may flatten the new candidates to incorporate them evenly, so everything is generalized throughout.

Controller 110 may generate and store probabilistic KG 120 such that respective confidence scores may be stored as metadata associated with each respective edge, such as a combined confidence score or weight, and/or sub scores or weights relating to individual factors. In some examples, data of the confidence score may be stored graphically, such as the increasingly dashed lines depicted in FIG. 1 of probabilistic KG 120 as edges 128 extend further out across probabilities 126 (e.g., where relatively lower trust depicts more dashed lines). Further, though in FIG. 1 nodes just include the text "USER" and "FACT" and "PROBABILITY" (along with respective reference numbers) for the sake of illustration, in practice nodes may include a title (or other relevant information, such as a score or weight) of the respective edge.

Once probabilistic KG 120 is generated, controller 110 may send probabilistic KG 120 to one or more downstream applications 150 for analysis. For example, controller 110 may send probabilistic KG 120 to a respective downstream application 150 that relates to healthcare analysis to analyze various treatment options for an entity that is a human. For another example, controller 110 may send probabilistic KG 120 to a respective downstream application 150 run by a government social service to see what variety of social service program may be advantageous for a human entity of probabilistic KG 120.

Controller 110 may interface with downstream application 150 over network 160. Network 160 may include a computing network over which computing messages may be sent and/or received. For example, network 160 may include the Internet, a local area network (LAN), a wide area network (WAN), a wireless network such as a wireless LAN (WLAN), or the like. Network 160 may comprise copper transmission cables, optical transmission fibers, wireless transmission, routers, firewalls, switches, gateway computers and/or edge servers. A network adapter card or network interface in each computing/processing device (e.g., computing devices that host/include controller 110, entity data 130, domain knowledge 140, and/or downstream application 150) may receive messages and/or instructions from and/or through network 160 and forward the messages and/or instructions for storage or execution or the like to a respective memory or processor of the respective computing/processing device. Though network 160 is depicted as a single entity in FIG. 1 for purposes of illustration, in other examples network 160 may include a plurality of private and/or public networks.

For example, consider a situation where a data analyst at an organization provides social programs to populations, and this analyst has identified an individual with the following distinct characteristics (e.g., raw unstructured data from entity data 130): 21 year old, male, substance abuse history, diabetic. The analyst may feed this into any variety of knowledge graph generator to create a knowledge graph with these few nodes and edges. The analyst may attempt to determine what types of fact patterns are likely to occur in the future for this human, and what variety of programs would be most beneficial for this human. However, the few data points here may be so broad and generic that answers are unlikely to provide answers that are targeted enough to have significantly high chances of success as compared to an unintelligent solution.

Accordingly, the analyst may provide the data of this situation to controller 110. Controller 110 may analyze the provided data and identify areas of domain knowledge 140 that relate to this initial EKG. For example, controller 110 may look at clinical trials and/or medical publications related to substance abuse, and/or diabetes. Controller 110 may identify that publications detail that young men in this age range have trouble staying in college as a result of a combination of substance abuse and diabetes, and/or that they rank their mental health as unsatisfactory. Controller 110 may identify if these publications have demographics or characteristics that align well with the human of the EKG, and/or list other factors that indicate how reliable the studies were (e.g., sample size, peer reviewed, study duration, or the like), where one or both of these could go into a confidence score of edges of these respective nodes as the nodes relate to the human.

Controller 110 may then generate probabilistic additions to the initial EKG. For example, controller 110 may add a first probabilistic node "college troubles" and a second probabilistic node "mental health concern," where both of these two probabilistic nodes have confidence scores relating to how likely it is that these are going to be true of the human. Controller 110 may further determine that the literature links together mental health and college troubles, such that controller 110 may link these two probabilistic nodes together with a probabilistic edge, where this edge has a confidence score. In this way, controller 110 may align data and scores across n-ary relations and entities. This may further include using a schema to homogenize terms, conclusions, hypotheses, or the like among all of the data of the domain knowledge 140 as controller 110 is integrating this data into probabilistic KG 120.

In some examples, controller 110 may continue this process numerous times, always searching domain knowledge 140 for the new nodes and edges to add as probabilities. Controller 110 may continue adding nodes and edges so long as new nodes and edges have a determined probability that surpasses a threshold. For example, controller 110 may continue adding probabilistic nodes and edges so long as they are found to have at least a 0.25 probability in relation to the distinct characteristics found in entity data 130 (e.g., potentially as linked through other probabilities 126). As controller 110 links probabilities 126 to existing probabilities 126 (e.g., rather than linking probabilities to facts 124), controller 110 may require additional rationale to include these outer probabilities 126. For example, controller 110 may require that the data came from a better source, and/or controller 110 may require that the data was provided at least a threshold number of times independent of each other.

As described above, controller 110 may include or be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interface 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with devices that host entity data 130, domain knowledge 140, downstream applications 150, or the like. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to generate a probabilistic entity-centric knowledge graph. Controller 110 may utilize processor 220 to generate a EKG. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to generate a probabilistic knowledge graph accordingly.

Processor 220 may generate a probabilistic knowledge graph according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may generate a probabilistic knowledge graph as described herein according to instructions 232 of one or more applications (e.g., software applications) stored in memory 230 of controller 110.

In addition to instructions 232, in some examples gathered or predetermined data or techniques or the like as used by processor 220 to generate a probabilistic knowledge graph as described herein may be stored within memory 230. For example, memory 230 may include information described above that is gathered from entity data 130 and/or domain knowledge 140, and/or memory 230 may include data of probabilistic KG 120. Specifically, as depicted in FIG. 2, memory 230 may include probabilistic entity knowledge graph 234, node data 236, edge data 238, and confidence data 240. Node data 236 may include the distinct characteristics as gathered from entity data 130 and/or domain knowledge 140 as it relates to the entity of probabilistic KG 120. Further, as depicted, node data 236 relates to edge data 238. Edge data 238 details the relationship that connected nodes 236 have with each other, and/or to the entity of probabilistic KG 120. Edge data 238 and node data 236 may be associated with confidence data 240, which includes a score or weight that indicates a general probability that the node data 236 accurately relates to the entity. For example, confidence data 240 may include a single score that is a compilation of a first score that indicates the reliability of data underlying the node data 236, and a second score that indicates the likelihood that node data 236 relates to the human.

Memory 230 may further include natural language processing (NLP) techniques 242. NLP techniques 242 can include, but are not limited to, semantic similarity, syntactic analysis, and ontological matching. For example, in some embodiments, processor 220 may be configured to analyze natural language data of data exhaust or the like as gathered from entity data 130, domain knowledge 140, and/or other devices or components of network 160 to determine semantic features (e.g., word meanings, repeated words, keywords, etc.) and/or syntactic features (e.g., word structure, location of semantic features in headings, title, etc.) of this natural language data. Ontological matching could be used to map semantic and/or syntactic features to a particular concept. The concept can then be used to identify entities, relationships therebetween, or confidence scores of either by finding bits of data that suggests a probability that could be reflected within probabilistic KG in any manner described herein.

Further, memory 230 may include threshold and preference data 244. Threshold and preference data 244 may include thresholds that define a manner in which controller 110 is to generate probabilistic KG 120. For example, threshold and preference data 244 may include thresholds at which controller 110 is to determine that data within domain knowledge 140 is relevant to an entity. For example, threshold and preference data 244 may detail that a node and edge is to be included within probabilistic KG 120 only if the confidence score is bigger than 0.25, or 0.5, or any other number.

Memory 230 may further include machine learning techniques 246 that controller 110 may use to improve a process of generating probabilistic knowledge graphs as described herein over time. Machine learning techniques 246 can comprise algorithms or models that are generated by performing supervised, unsupervised, or semi-supervised training on a dataset, and subsequently applying the generated algorithm or model to manage data exhaust. Using these machine learning techniques 246, controller 110 may improve an ability of determining what data is to belong in probabilistic KG 120, and/or otherwise generating probabilistic KG 120. For example, controller 110 may identify certain types of data within domain data 140 that is found to be more predictive and/or useful for different types of entities once probabilistic KG 120 is used in downstream applications 150. In response to such determinations, controller 110 may be more likely to identify such types of data as being relevant to respective types of entities (e.g., by changing how confidence scores are calculated, and/or by changing a respective threshold within threshold and preference data 246).

Machine learning techniques 246 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 246 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
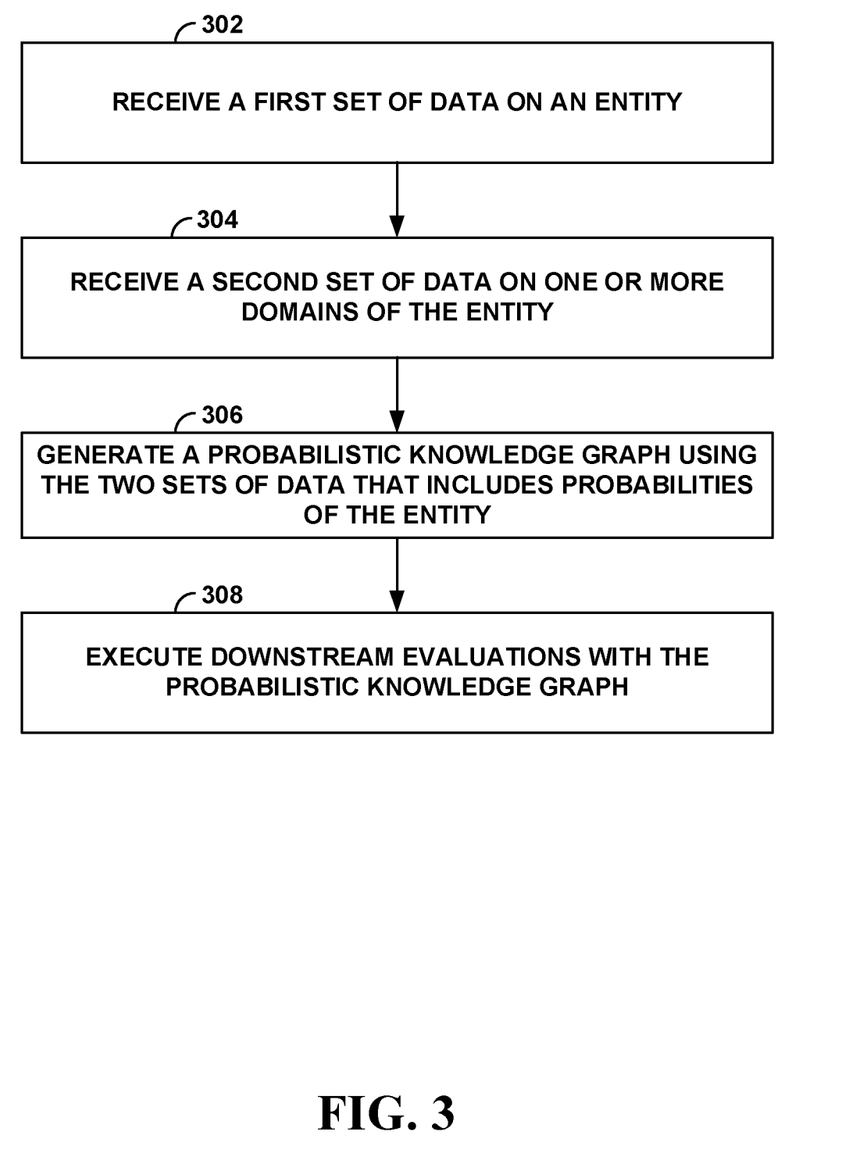
FIG. 3 depicts an example flowchart by which the controller of FIG. 1 may generate the probabilistic entity-centric knowledge graph.

Using these components, controller 110 may generate probabilistic KG 120 as discussed herein. For example, controller 110 may generate EKGs according to flowchart 300 depicted in FIG. 3. Flowchart 300 of FIG. 3 is discussed with relation to FIG. 1 for purposes of illustration, though it is to be understood that other environments with other components may be used to execute flowchart 300 of FIG. 3 in other examples. Further, in some examples controller 110 may execute a different method than flowchart 300 of FIG. 3, or controller 110 may execute a similar method with more or less steps in a different order, or the like.

Controller 110 receives a first set of data on an entity (302). Controller 110 may receive this from data as an initial KG, and/or controller 110 may receive this data as a set of distinct characteristics data on the entity. If controller 110 receives this data as distinct characteristics on the entity, controller 110 creates an initial knowledge graph on this distinct characteristics (e.g., where the data of this initial knowledge graph all has a probability of 1.0).

Controller 110 receives a second set of data on one or more domains of the entity (304). For example, controller 110 may analyze nodes of the initial knowledge graph to identify domains of the entity. Specifically, if the entity is a human and nodes of the initial EKG includes a demographic of the human, a career of the human, a hobby of the human, or the like, controller 110 will identify this characteristic as a potential domain for controller 110 to search within. Once controller 110 identifies such a domain, controller 110 may crawl through public repositories or the like within this domain to identify data that matches nodes of the initial knowledge graph, and if anything matches controller 110 will gather any underlying data that details this association.

Controller 110 generates probabilistic KG 120 that includes both the distinct characteristics and data from the domains of the entity such that the generated probabilistic KG 120 includes probabilities (306). Controller 110 may generate probabilistic KG 120 such that each probabilistic edges has a respective confidence score. In some examples, such confidence scores include a first element reflecting a likelihood of the probability relating to the entity, and a second element quantifying/reflecting a reliability of the underlying data.

Controller 110 may normalize each confidence score. For example, controller 110 may normalize confidence scores in clusters based on, e.g., the number of factors that are predefined, and/or the number of factors that are predicted. Controller 110 may normalize confidence scores not only within a given probabilistic KG 120, but also across all generated probabilistic KGs 120.

Controller 110 executes downstream evaluations using probabilistic KG 120 (308). For example, this includes controller 110 using probabilistic KG 120 to identify interventions for that type of human (e.g., where the entity is a cohort). For another example where the entity is a human, controller 110 could use probabilistic KG 120 to predict medical or social issues for a human, and provide help prior to these issues arising.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following are clauses that detail sample embodiments of this disclosure.

Clause 1 relates to embodiments that include a computer-implemented method that comprises receiving a first set of data on an entity, wherein the first set of data includes distinct characteristics of the entity; receiving a second set of data on one or more domains of the entity; and generating, using the first and second set of data, a probabilistic knowledge graph for the entity that includes an entity node and a first plurality of nodes connected to the entity node and representing each of the distinct characteristics and a second plurality of nodes connected via probabilistic edges, wherein each of the probabilistic edges has an associated confidence score determined using the second set of data.

Clause 2 includes embodiments of clause 1, wherein the entity is a material.

Clause 3 includes embodiments of clause 1, wherein the entity is a human or cohort of humans.

Clause 4 includes embodiments of clause 3, wherein the data on the human or cohort is received as a entity knowledge graph.

Clause 5 includes some embodiments of clause 3, wherein the data on the human or cohort is received as raw unstructured data on the human or cohort.

Clause 6 includes some embodiments of any of clauses 3-5, further comprising using the probabilistic knowledge graph to identify suitable interventions for the human or cohort.

Clause 7 includes some embodiments of any of clauses 1-6, wherein the second plurality of nodes completes the probabilistic knowledge graph.

Clause 8 includes some embodiments of any of clauses 1-7, wherein each confidence score includes a first score quantifying a likelihood of a probability of a respective probabilistic edge being true.

Clause 9 includes some embodiments of any of clauses 1-8, wherein each confidence score includes a second score quantifying a confidence score of a reliability of underlying data of respective probabilistic edges.

Clause 10 includes some embodiments of any of clauses 1-9, wherein the second plurality of nodes includes at least one includes node that represents something that is known to not currently be factual with regard to the entity.

Clause 11 includes some embodiments of clause 10, wherein the at least one node is connected in the probabilistic knowledge graph with a probabilistic edge with a confidence score that relates to the probability that the something could be factual with regard to the entity in the future.

Clause 12 includes some embodiments of any of clauses 1-11, further comprising normalizing each confidence score of each probabilities in a cluster based on the number of factors that are predefined and the number of factors that are predicted.

Clause 13 includes some embodiments of any of clauses 1-12, wherein the receiving the second set of data on one or more domains of the entity includes crawling through open-world data to identify the second set of data.

Clause 14 includes some embodiments of clause 13, wherein the open-world data includes the Internet.

Clause 15 includes some embodiments a system that includes a memory and a processor, where the memory includes instructions that, when executed by the processor, causes the processor to cause the methods of any of clauses 1-14.

Clause 16 includes some embodiments of a computer program product comprising a computer readable storage medium having program instructions embodied therewith, the program instructions executable by a computer to cause the computer to execute the methods of any of clauses 1-14.

What is claimed is:

1. A computer-implemented method comprising:
receiving a first set of data on an entity, wherein the first set of data includes distinct characteristics of the entity;
receiving a second set of data on one or more domains of the entity;
generating, using the first and second set of data, a probabilistic knowledge graph (PKG) for the entity that includes an entity node and a first plurality of nodes connected to the entity node and representing each of the distinct characteristics and a second plurality of nodes connected via probabilistic edges, wherein each of the probabilistic edges has an associated confidence score determined using the second set of data;
extracting and homogenizing the first and second set of data, via association rule mining, pertaining to one or more entities and associated relationships, on the PKG, using open-world data sources;
extracting and aligning, via fuzzy mapping rules, the first and second set of data to make it fit as intended within the PKG using a normalization layer when importing data domain knowledge, including normalizing respective confidence scores;
identifying data that relates to the one or more entities and associated relationships on the PKG, together with a likelihood that the identified data is related to the one or more entities;
quantifying an associated probability and reliability score with the data that applies to the one or more entities on the PKG; and
adding the one or more entities and associated relationships to the PKG with the associated probability and reliability scores to improve an ability to hone in at a desired end result.

2. The computer-implemented method of claim 1, wherein the second plurality of nodes completes the probabilistic knowledge graph.

3. The computer-implemented method of claim 1, wherein the entity is selected from a group that includes a material, a human, or a cohort of humans.

4. The computer-implemented method of claim 3, wherein the data on the entity is received as a knowledge graph.

5. The computer-implemented method of claim 3, wherein the data on the entity is received as raw unstructured data on the human.

6. The computer-implemented method of claim 3, further comprising using the probabilistic knowledge graph to identify suitable interventions or actions for the entity.

7. The computer-implemented method of claim 1, wherein each confidence score includes a first score quantifying a likelihood of a probability of a respective probabilistic edge being true.

8. The computer-implemented method of claim 1, wherein each confidence score includes a second score quantifying a confidence score of a reliability of underlying data of respective probabilistic edges.

9. The computer-implemented method of claim 1, wherein the second plurality of nodes includes at least one node that represents something that is known to not currently be factual with regard to the entity.

10. The computer-implemented method of claim 9, wherein the at least one node is connected in the probabilistic knowledge graph with a probabilistic edge with a confidence score that relates to the probability that the something could be factual with regard to the entity in future.

11. The computer-implemented method of claim 1, further comprising normalizing each confidence score of the each probabilities in a cluster based on a number of factors that are predefined and another number of factors that are predicted.

12. The computer-implemented method of claim 1, wherein the receiving the second set of data on one or more domains of the entity includes crawling through open-world data to identify the second set of data.

13. A system comprising:
a processor; and
a memory in communication with the processor, the memory containing instructions that, when executed by the processor, cause the processor to:
receive a first set of data on an entity, wherein the first set of data includes distinct characteristics of the entity;
receive a second set of data on one or more domains of the entity;
generate, using the first and second set of data, a probabilistic knowledge graph (PKG) for the entity that includes an entity node and a first plurality of nodes connected to the entity node and representing each of the distinct characteristics and a second plurality of nodes connected via probabilistic edges, wherein each of the probabilistic edges has an associated confidence score determined using the second set of data;
extract and homogenize the first and second set of data, via association rule mining, pertaining to one or more entities and associated relationships, on the PKG, using open-world data sources;
extract and align, via fuzzy mapping rules, the first and second set of data to make it fit as intended within the PKG using a normalization layer when importing data domain knowledge, including normalizing respective confidence scores;
identify data that relates to the one or more entities and associated relationships on the PKG, together with a likelihood that the identified data is related to the one or more entities;
quantify an associated probability and reliability score with the data that applies to the one or more entities on the PKG; and
add the one or more entities and associated relationships to the PKG with the associated probability and reliability scores to improve an ability to hone in at a desired end result.

14. The system of claim 13, wherein the entity is a material.

15. The system of claim 13, wherein the second plurality of nodes completes the probabilistic knowledge graph.

16. The system of claim 13, wherein the entity is a human or cohort of humans.

17. The system of claim 13, wherein the data on a human or cohort is received as raw unstructured data on the human.

18. The system of claim 17, the memory containing additional instructions that, when executed by the processor, cause the processor to further use the probabilistic knowledge graph to identify suitable interventions for the human or cohort.

19. The system of claim 13, wherein each confidence score includes a first score quantifying a likelihood of a probability of a respective probabilistic edge being true.

20. The system of claim 13, wherein each confidence score includes a second score quantifying a confidence score of a reliability of underlying data of respective probabilistic edges.

21. The system of claim 13, wherein the second plurality of nodes includes at least one includes node that represents something that is known to not currently be factual with regard to the entity.

22. The system of claim 21, wherein the at least one node is connected in the probabilistic knowledge graph with a probabilistic edge with a confidence score that relates to the probability that the something could be factual with regard to the entity in future.

23. The system of claim 13, the memory containing additional instructions that, when executed by the processor, cause the processor to normalize each confidence score of the each probabilities in a cluster based on a number of factors that are predefined and another number of factors that are predicted.

24. A computer program product, the computer program product comprising a computer readable storage medium having program instructions embodied therewith, the program instructions executable by a computer to cause the computer to:

receive a first set of data on an entity, wherein the first set of data includes distinct characteristics of the entity;

receive a second set of data on one or more domains of the entity;

generate, using the first and second set of data, a probabilistic knowledge graph (PKG) for the entity that includes an entity node and a first plurality of nodes connected to the entity node and representing each of the distinct characteristics and a second plurality of nodes connected via probabilistic edges, wherein each of the probabilistic edges has an associated confidence score determined using the second set of data;

extract and homogenize the first and second set of data, via association rule mining, pertaining to one or more entities and associated relationships, on the PKG, using open-world data sources;

extract and align, via fuzzy mapping rules, the first and second set of data to make it fit as intended within the PKG using a normalization layer when importing data domain knowledge, including normalizing respective confidence scores;

identify data that relates to the one or more entities and associated relationships on the PKG, together with a likelihood that the identified data is related to the one or more entities;

quantify an associated probability and reliability score with the data that applies to the one or more entities on the PKG; and     add the one or more entities and associated relationships to the PKG with the associated probability and reliability scores to improve an ability to hone in at a desired end result.

25. A computer-implemented method comprising:

receiving a first set of data on a human, wherein the first set of data includes distinct characteristics of a human;

receiving a second set of data on one or more domains of the human;

generating, using the first and second set of data, a probabilistic knowledge graph (PKG) for the entity that includes a human node and a first plurality of nodes connected to the human node and representing each of the distinct characteristics and a second plurality of nodes connected via probabilistic edges, wherein each of the probabilistic edges has an associated confidence score determined using the second set of data;

extracting and homogenizing the first and second set of data, via association rule mining, pertaining to one or more entities and associated relationships, on the PKG, using open-world data sources;

extracting and aligning, via fuzzy mapping rules, the first and second set of data to make it fit as intended within the PKG using a normalization layer when importing data domain knowledge, including normalizing respective confidence scores;

identifying data that relates to the one or more entities and associated relationships on the PKG, together with a likelihood that the identified data is related to the one or more entities;

quantifying an associated probability and reliability score with the data that applies to the one or more entities on the PKG; and     adding the one or more entities and associated relationships to the PKG with the associated probability and reliability scores to improve an ability to hone in at a desired end result.

\* \* \* \* \*